United States Patent
Zheng et al.

(10) Patent No.: US 11,579,078 B2
(45) Date of Patent: Feb. 14, 2023

(54) TERAHERTZ GAS SPECTROMETER DETECTION SYSTEM

(71) Applicant: TSINGHUA UNIVERSITY, Beijing (CN)

(72) Inventors: Xiaoping Zheng, Beijing (CN); Zhijie Li, Beijing (CN); Xiaojiao Deng, Beijing (CN); Yihao Li, Beijing (CN); Yiwei Bai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/468,206

(22) Filed: Sep. 7, 2021

(65) Prior Publication Data
US 2023/0009935 A1    Jan. 12, 2023

(30) Foreign Application Priority Data

Jul. 8, 2021   (CN) .......................... 202110774934.0

(51) Int. Cl.
  *G01N 21/3581* (2014.01)
  *G01N 21/17* (2006.01)

(52) U.S. Cl.
  CPC ..... *G01N 21/3581* (2013.01); *G01N 21/1717* (2013.01)

(58) Field of Classification Search
  CPC .................. G01N 21/3581; G01N 21/1717
  See application file for complete search history.

(56) References Cited

U.S. PATENT DOCUMENTS

| | | | |
|---|---|---|---|
| 11,243,161 B1 * | 2/2022 | Lien | G01N 21/3504 |
| 2011/0001173 A1 * | 1/2011 | Ojefors | H01Q 9/285 |
| | | | 257/E31.079 |

OTHER PUBLICATIONS

Chinese Office Action for App. No. 202110774934.0, dated Mar. 15, 2022 (16 pages).
Zhijie Li et al., "Qualitative and Quantitative Analysis of Terahertz Gas-Phase Spectroscopy Using Independent Component Analysis", Chemometrics and Intelligent Laboratory Systems, 206, 104129, Aug. 19, 2020, pp. 1-9.

\* cited by examiner

*Primary Examiner* — David P Porta
*Assistant Examiner* — Gisselle M Gutierrez
(74) *Attorney, Agent, or Firm* — Nixon Peabody LLP; Jeffrey L. Costellia

(57) ABSTRACT

A terahertz gas spectrometer detection system is provided. The system includes: a terahertz generation module, a gas module, a terahertz detection module and a program-control and acquisition module. terahertz generation module is configured for generating and transmitting terahertz signals with different frequencies; gas module is configured for setting and storing to-be-detected gas, so that terahertz signals with different frequencies pass through the to-be-detected gas; terahertz detection module is configured for detecting amplitude signals of terahertz signals after passing through the to-be-detected gas through field effect transistor detector; program-control and acquisition module is configured for controlling the terahertz generation module to generate and transmit frequency of terahertz signal, and is further configured for acquiring amplitude detection signals of terahertz signals after passing through the to-be-detected gas, and generating spectrogram of to-be-detected gas.

10 Claims, 3 Drawing Sheets

TERAHERTZ GAS SPECTROMETER DETECTION SYSTEM

CROSS REFERENCE TO THE RELATED APPLICATIONS

The application is based upon and claims priority to Chinese Patent Application No. 2021107749340 filed on Jul. 8, 2021, the entire contents of which are incorporated herein by reference.

TECHNICAL FIELD

The present application relates to the field of spectroscopy detection technology and, more particularly, to a terahertz gas spectrometer detection system.

BACKGROUND

Terahertz wave (THz wave) has a wavelength between infrared and microwave range. Since the levels of vibration absorption of many molecules are located in the range between the far-infrared to terahertz, which are produced by molecules interactions, vibration transitions, dipole rotation and low-frequency vibration of crystal lattice, the fingerprint spectra of these substances can be accurately obtained by terahertz spectroscopy. Therefore, the terahertz spectroscopy can be taken as an effective way to research the structural characteristics of unknown materials of some fields, like in the field of chemistry or material science; moreover, the terahertz spectroscopy may also have its applicative prospect as another effective way to identify the known molecules (such as poisons, drugs and explosives, or the like).

In the prior art, the terahertz spectroscopy detection system has the disadvantage of low sensitivity in a high frequency band. Therefore, the present disclosure provides a terahertz gas spectrometer detection system which is capable of overcoming the above technical problems.

SUMMARY

In light of the above problems, the embodiments of the present disclosure provide a terahertz gas spectrometer detection system so as to overcome or at least partially solve the above problems.

The embodiments of the present disclosure provide a terahertz gas spectrometer detection system, wherein the system comprises: a terahertz generation module, a gas module, a terahertz detection module, and a program-control along with acquisition module;

the terahertz generation module is configured for generating and transmitting terahertz signals with different frequencies;

the gas module is configured for setting and storing to-be-detected gas, so that the terahertz signals with different frequencies pass through the to-be-detected gas;

the terahertz detection module is configured for detecting amplitude signals of the terahertz signals with different frequencies after passing through the to-be-detected gas through a field effect transistor detector; and the program-control and acquisition module is configured for controlling the terahertz generation module to generate and transmit the frequency of the terahertz signal, and is further configured for acquiring amplitude detection signals of the terahertz signals with different frequencies after passing through the to-be-detected gas, and generating a spectrogram of the to-be-detected gas.

Optionally, the terahertz generation module comprises: a local oscillator and a solid-state frequency multiplication chain, wherein:

the local oscillator is configured for generating baseband signals with different frequencies; and the solid-state frequency multiplication chain is configured for multiplying the baseband signals with different frequencies to obtain the terahertz signals with different frequencies and transmit the terahertz signals with different frequencies.

Optionally, the gas module comprises: a sample injection unit, a pressure control unit and a gas cavity unit, wherein:

the sample injection unit is configured for adding at least one to-be-detected gas into a gas cavity in the gas cavity unit;

the pressure control unit is configured for controlling a pressure in the gas cavity so as to control a relative concentration of each to-be-detected gas added in the gas cavity; and the gas cavity unit is configured for enabling the terahertz signals with different frequencies generated by the terahertz generation module to pass through the gas cavity.

Optionally, the sample injection unit comprises: a pipeline, control valves and sample bottles, wherein:

the sample bottle is configured for storing the liquid to-be-detected sample, and the liquid to-be-detected sample enters the gas cavity by volatilizing the to-be-detected gas;

the pipeline comprises a main pipe and branch pipes, wherein: the main pipe is connected with a plurality of branch pipes, each branch pipe is connected with one sample bottle, and the main pipe is also connected with the gas cavity through a corrugated connecting pipe and a flange interface, so that the to-be-detected gas in the sample bottle enters the gas cavity through the branch pipes and the main pipe; and the control valves are disposed on each branch pipe and configured for controlling a communication state between the sample bottle connected with each branch pipe and the gas cavity by adjusting on-off states of different control valves.

Optionally, the sample injection unit further comprises: a liftable support rod and a base, wherein:

the base is configured for lifting the sample bottle;

the liftable support rod implements a liftable function through screw adjustment and is configured for fixing and supporting the main pipe; and the liftable support rod is further configured for supporting the base, so as to implement the liftable function of the base and provide a movable space for disassembling and installing the sample bottle.

Optionally, the pressure control unit comprises: a vacuum pump, a valve and a pressure gauge, wherein:

the vacuum pump is configured for vacuumizing an interior of the gas cavity;

the pressure gauge is arranged on the gas cavity and configured for measuring the pressure in the gas cavity so as to control the relative concentration of the to-be-detected gas in the gas cavity; and the valves comprises a vent valve, a vacuum cut-off valve and a pressure micro-metering valve, wherein: the vent valve is arranged on the gas cavity and configured for controlling a communication state inside and outside the gas cavity; the vacuum cut-off valve is arranged between the vacuum pump and the gas cavity, and it is configured for controlling a vacuumizing effect of the vacuum pump on the gas cavity by adjusting on-off states; and the pressure micro-metering valve is disposed between the vacuum cut-off valve and the vacuum pump, and it is configured for controlling a vacuumizing rate of the vacuum pump on the gas cavity, thereby implementing fine control of the internal pressure of the gas cavity.

Optionally, the gas cavity unit comprises: the gas cavity, wherein:

the gas cavity is configured for containing the at least one to-be-detected gas added by the sample introduction unit, so that the terahertz signals after passing through the to-be-detected gas are detected by the terahertz detection module; and the gas cavity is connected with the pressure control unit through the flange interface, and is connected with the sample injection unit through a rubber-gasket sealed interface.

Optionally, the terahertz detection module comprises: the field effect transistor detector, wherein:

the field effect transistor detector is based on a two-dimensional plasmon and configured for detecting the amplitude signals of the terahertz signals after receiving the terahertz signals.

Optionally, the program-control and acquisition module comprises: an oscilloscope and an upper computer, wherein:

the oscilloscope is configured for reading voltage values of the amplitude detection signals output by the field effect transistor detector and transmitting the voltage values to the upper computer;

the upper computer is configured for calculating and storing the voltage values, and generating the spectrogram of the to-be-detected gas according to the voltage values of the terahertz signals with different frequencies;

the upper computer is further configured for synergistically controlling the terahertz generation module to generate the terahertz signals and the oscilloscope to read the voltage values; and the upper computer is further configured for determining whether all to-be-detected data points are completely and effectively stored by judging whether the preceding storage is completed or not.

Optionally, the oscilloscope is configured for reading the voltage values of the amplitude detection signals output by the field effect transistor detector, comprising:

setting two cursors of the oscilloscope, and acquiring the amplitude detection signals with high resolution in a rolling time base mode to obtain two voltage values.

The embodiments of the present disclosure comprise the following advantages.

In the embodiments, the terahertz gas spectrometer detection system comprises: the terahertz generation module, the gas module, the terahertz detection module and the program-control and acquisition module. The terahertz generation module is configured for generating and transmitting the terahertz signals with different frequencies; the gas module is configured for setting and storing the to-be-detected gas, so that the terahertz signals with different frequencies pass through the to-be-detected gas; the terahertz detection module is configured for detecting the amplitude signals of the terahertz signals with different frequencies after passing through the to-be-detected gas through the field effect transistor detector; and the program-control and acquisition module is configured for controlling the terahertz generation module to generate and transmit the frequency of the terahertz signal, and is further configured for acquiring amplitude detection signals of the terahertz signals with different frequencies after passing through the to-be-detected gas, and generating the spectrogram of the to-be-detected gas. In the present application, the field effect transistor detector is used for detection, which has the advantages of rapid response and high sensitivity in gas spectrum detection, and has excellent performances even in high frequency band; and the to-be-detected gas may be identified through the generated spectrogram.

BRIEF DESCRIPTION OF THE DRAWINGS

In order to more clearly illustrate the technical solutions of the embodiments of the present invention, the drawings that are required to describe the embodiments of the present disclosure will be briefly introduced below. Apparently, the drawings that are described below are only some embodiments of the present invention, and those of ordinary skills in the art may obtain other drawings according to these drawings without paying creative work.

DETAILED DESCRIPTION OF THE EMBODIMENTS

In order to make the above objects, the features and the advantages of the present application be more clearly understood, the present application will be described in further detail below with reference to the drawings and detailed description.

Photonic generation and electronic generation are two main ways for generating terahertz waves. The terahertz spectroscopy detection system based on the photonic generation has wide detection bandwidth and high detection frequency band, but low spectral resolution. On the contrary, although the detection bandwidth and the detection frequency band are slightly reduced in the terahertz spectroscopy detection system based on the electronic generation, the spectral resolution is significantly raised instead.

The inventor considers of that the vibration and rotational energy level of many gas molecules perform significant absorption when they fall on the terahertz band, which is also called "Fingerprint Spectrum". The natural line-widths for characteristic peaks of the gas molecules are narrow and sites are densely packed influenced by the finite lifetime. A narrow detection bandwidth is enough to obtain a large amount of characteristic information to identify the most of gas molecules. Therefore, the inventor hits upon an idea for generating terahertz spectroscopy based on the electronic generation.

The terahertz spectroscopy detection system based on the electronic generation in the prior art usually adopts a Schottky detector for amplitude detection, however the low sensitivity performed in a high frequency band sets constraints to the Schottky detector, which is the Schottky detector may only be used at room or low temperature.

Therefore, the inventors propose a terahertz gas spectrometer detection system by considering multiple aspects like the detection frequency band, detection bandwidth, spectral resolution, device complexity, overall cost, gas molecule characters and detector performances.

Figure 1:
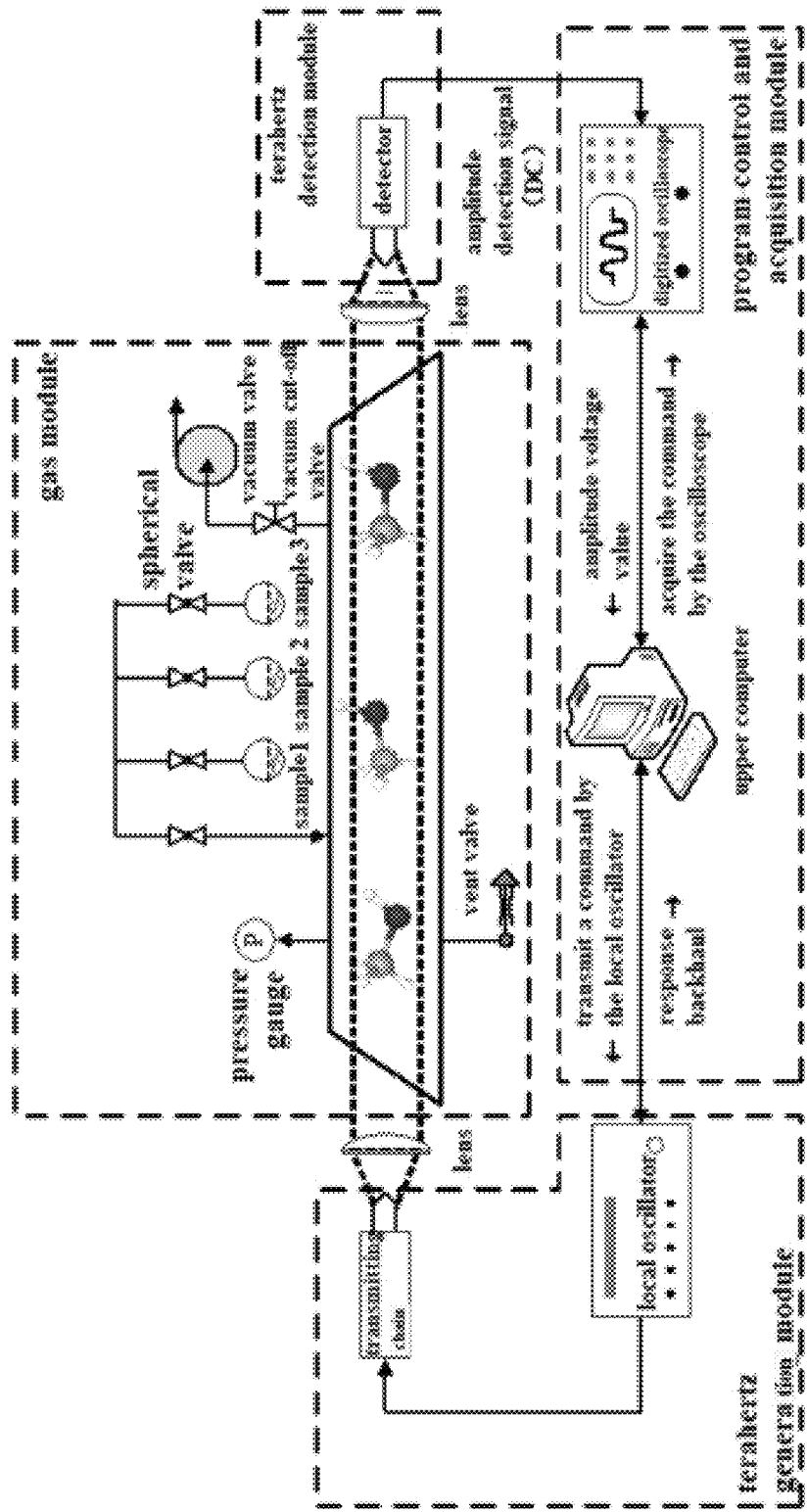
FIG. 1 is a frame diagram of a terahertz gas spectrometer detection system in the embodiments of the present invention.

FIG. 1 is a frame diagram of a terahertz gas spectrometer detection system in the embodiments of the present disclosure. As shown in FIG. 1, the terahertz gas spectrometer detection system includes: a terahertz generation module, a gas module, a terahertz detection module and a program-control and acquisition module. The terahertz generation module is configured for generating and transmitting terahertz signals with different frequencies; the gas module is configured for setting and storing to-be-detected gas, to make the terahertz signals with different frequencies pass through the to-be-detected gas; the terahertz detection module is configured for detecting amplitude signals of the terahertz signals with different frequencies after passing through the to-be-detected gas through a field effect transistor detector; and the program-control and acquisition module is configured for controlling the terahertz generation module to generate and transmit the frequency of the terahertz signal, and is further configured for acquiring amplitude detection signals of the terahertz signals with different frequencies after passing through the to-be-detected gas, and generating a spectrogram of the to-be-detected gas.

The terahertz gas spectrometer detection system further comprises two plano-convex lenses. The two plano-convex lenses are respectively located at two ends of the gas module, and configured for enabling the terahertz signals transmitted by terahertz generation module to pass through a gas cavity of the gas module after being collimated by one plano-convex lens, and then to be focused by the other plano-convex lens and to be received by the terahertz detection module.

The two plano-convex lenses are respectively disposed at two ends of the gas cavity, and the lenses may be TPX lenses with a diameter of 1 inch and a focal length of 50 mm. The terahertz waves transmitted by the terahertz generation module are collimated by one plano-convex lens and then pass through the gas cavity, and then the terahertz waves are focused by the other plano-convex lens to an antenna of the field effect transistor detector to implement receiving.

The program-control and acquisition module is configured for controlling a frequency that the terahertz generation module generates and transmits the terahertz signal, and the generated terahertz signals are received and detected by the terahertz detection module after passing through the to-be-detected gas. The program-control and acquisition module acquires the amplitude detection signals output by the terahertz detection module, and generates the spectrogram of the to-be-detected gas, as to identify a category of the to-be-detected gas according to the spectrogram.

Optionally, as an embodiment, the terahertz generation module comprises: a local oscillator and a solid-state frequency multiplication chain, wherein: the local oscillator is configured for generating baseband signals with different frequencies; and the solid-state frequency multiplication chain is configured for multiplying the baseband signals with different frequencies to obtain the terahertz signals with different frequencies and transmit the terahertz signals with different frequencies.

Specifically, the local oscillator generates a baseband signal in a frequency range between 16.1 GHz to 20.6 GHz for each time, which is configured to be a local oscillator input of the chain, the frequency of the baseband signal generated at each time increases successively.

Figure 2:
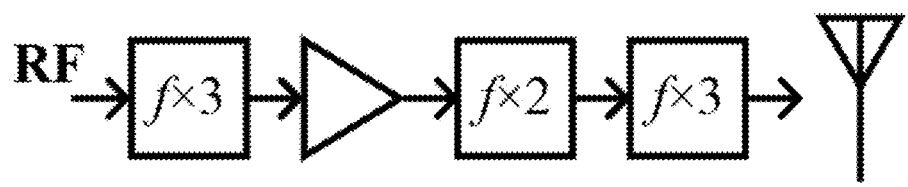
FIG. 2 is a frame diagram of a solid-state frequency multiplication chain in the embodiments of the present invention.

FIG. 2 is a frame diagram of a solid-state frequency multiplication chain in the embodiments of the present disclosure. The solid-state frequency multiplication chain comprises a Schottky diode frequency multiplier and a diagonal horn antenna. The Schottky diode frequency multiplier multiplies the baseband signal input every time by 18 times, thus generating a terahertz signal in a frequency range of 280 GHz to 400 GHz every time, and an output power of the terahertz signal is 0.5 mW to 0.9 mW. After the terahertz signal is generated, the terahertz signal is transmitted to free space by a WR2.8 diagonal horn antenna, and an angle of beam divergence of the antenna is 8 degrees.

Optionally, as an embodiment, the gas module comprises: a sample injection unit, a pressure control unit and a gas cavity unit, wherein: the sample injection unit is configured for adding at least one to-be-detected gas into a gas cavity in the gas cavity unit; the pressure control unit is configured for controlling a pressure in the gas cavity so as to control a relative concentration of each to-be-detected gas added in the gas cavity; and the gas cavity unit is configured for enabling the terahertz signals with different frequencies generated by the terahertz generation module to pass through the gas cavity.

The sample injection unit adopts a sample injection mode of introducing the components in sequence and controlling a concentration ratio of the components by partial pressure, to add the to-be-detected gas to the gas cavity in the gas cavity unit, which satisfies the configuration of multi-component mixed samples and has sample quantity expansibility. By matching with the pressure control unit, a concentration ratio of various to-be-detected gases in the gas cavity may be realized. The gas cavity unit contains the to-be-detected gas, and is configured for enabling the terahertz signals with different frequencies generated by the terahertz generation module to pass through the to-be-detected gas in the gas cavity, so as to obtain a characteristic spectrum of the to-be-detected gas, thereby determining the category of the to-be-detected gas or analyzing a structure of the to-be-detected gas.

Optionally, as an embodiment, the sample injection unit comprises: a pipeline, control valves and sample bottles, wherein: the sample bottle is configured for storing a liquid to-be-detected sample, and the liquid to-be-detected sample enters the gas cavity by volatilizing the to-be-detected gas; the pipeline comprises a main pipe and branch pipes, wherein: the main pipe is connected with a plurality of branch pipes, each branch pipe is connected with one sample bottle, and the main pipe is also connected with the gas cavity through a corrugated connecting pipe and a flange interface, so that the to-be-detected gas in the sample bottle enters the gas cavity through the branch pipes and the main pipe; and the control valves are disposed on each branch pipe and configured for controlling a communication state between the sample bottle connected with each branch pipe and the gas cavity by adjusting on-off states of different control valves.

Figure 3:
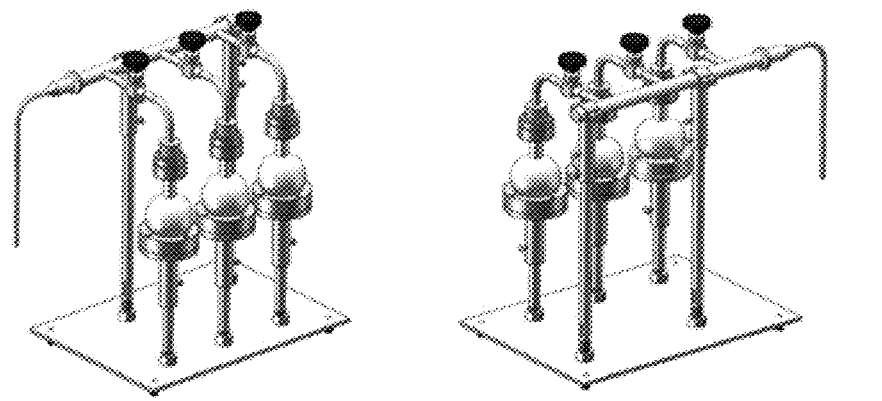
FIG. 3 is a pipeline design diagram of a sample injection unit in the embodiments of the present invention.

FIG. 3 illustrates a pipeline design diagram of the sample injection unit. The sample injection unit is integrally fixed on a metal plate with M6 standard threaded hole, and may be installed on a corresponding operation platform according to different requirements.

The sample injection unit comprises one main pipe and a plurality of branch pipes. The main pipe has a diameter (outer diameter) of about 19 mm and the branch pipes are stainless steel metal pipes with a diameter (outer diameter) of about 10 mm. By replacing the main pipes with different number of branch pipe interfaces and amplifying the quantity of the branch pipes, the configuration of the maximum quantity of components maybe further improved conveniently.

The main pipe is connected with the corrugated connecting pipe through a KF16 standard flange interface, and then communicates with gas cavity. Each branch pipe is connected with one sample bottle with an inner diameter of 13 mm by a flange interface, and sealed by a rubber gasket. The sample bottle is a quartz bottle with a volume of 14 ml, and configured for to holding the liquid to-be-detected sample, and a gaseous form of the to-be-detected sample is the to-be-detected gas. When the sample bottle is communicated with the gas cavity, the to-be-detected gas volatilized from the liquid to-be-detected sample in the sample bottle enters the gas cavity under the action of a pressure difference. A concentration of the injected to-be-detected gas may be better controlled through the volatile injection of the liquid sample. Each branch pipe is connected with the main pipe, so that the gas in the sample bottle enters the gas cavity through the branch pipes and the main pipe.

Each branch pipe is provided with a spherical control valve to control a communication state between the sample bottle and the gas cavity. The spherical control valve is convenient to control a sample introduction rate, which, by matching with the pressure control unit, may accurately control the concentration ratio of the to-be-detected gas in the gas cavity.

It may be understood that the size, material, sealing method, and the like, which are disclosed in the above embodiments are only preferred embodiments and different choices may be made according to different actual requirements. Furthermore, the design of the sample injection unit disclosed in the embodiments of the present disclosure may be used in other systems and structures, and is not limited to be applied in other terahertz systems disclosed in the embodiments of the present invention.

Optionally, as an embodiment, the sample injection unit further comprises: a liftable support rod and a base, wherein: the base is configured for lifting the sample bottle; the liftable support rod implements a liftable function through screw adjustment and is configured for fixing and supporting the main pipe; and the liftable support rod is further configured for supporting the base, so as to realize the liftable function of the base and provide a movable space for disassembling and installing the sample bottle.

A base is provided under each sample bottle for lifting the sample bottle to ensure the safety and stability of the sample bottle. Supporting and height adjustment of the base and the main pipe are realized by the liftable support rod. The liftable support rod may be two overlapped metal pipes, wherein the outer metal pipe is hollow or partially hollow, and a height of the liftable support rod may be adjusted by adjusting the length of the overlapped part between the two overlapped metal pipes, and then the two metal pipes are fixed by a screw. The liftable function of the base provides a movable space for disassembling and installing the sample bottle.

Optionally, as an embodiment, the pressure control unit comprises: a vacuum pump, a valve and a pressure gauge, wherein: the vacuum pump is configured for vacuumizing an interior of the gas cavity; the pressure gauge is disposed on the gas cavity and configured for measuring the pressure in the gas cavity, as to control the relative concentration of the to-be-detected gas in the gas cavity; and the valves comprises a vent valve, a vacuum cut-off valve and a pressure micro-metering valve, wherein: the vent valve is disposed on the gas cavity and configured for controlling a communication state inside and outside the gas cavity; the vacuum cut-off valve is disposed between the vacuum pump and the gas cavity, and it is configured for controlling a vacuumizing effect of the vacuum pump on the gas cavity by adjusting on-off states; and the pressure micro-metering valve is disposed between the vacuum cut-off valve and the vacuum pump, and it is configured for controlling a vacuumizing rate of the vacuum pump on the gas cavity, thereby realizing fine control of the internal pressure of the gas cavity.

The pressure in the gas cavity may reflect the concentration of the added to-be-detected gas, so the concentration ratio of various to-be-detected gases may be controlled by controlling a change value of the pressure in the gas cavity after adding each type of to-be-detected gas. The pressure control units implement the synergetic control in order to control the pressure in the gas cavity.

The pressure gauge is connected with the gas cavity, and it is configured for measuring the pressure in the gas cavity, as to control the relative concentration of the to-be-detected gas in the gas cavity.

When opening the vent valve, the inside and outside of the gas cavity may be connected and the air pressures inside and outside the gas cavity are equal, thus exhausting the gas inside the gas cavity. The vacuum cut-off valve is disposed between the vacuum pump and the gas cavity, and it is configured for controlling a vacuumizing effect of the vacuum pump on the gas cavity by adjusting on-off states. When the gas cavity is only connected with the vacuum pump, the vacuum pump vacuumizes the inside of the gas cavity to exhaust the residual gas in the gas cavity. When the inside of the gas cavity is only connected with the vacuum pump, which means that the vacuum cut-off valve is opened while all other valves connected to the gas cavity are closed. The pressure micro-metering valve may fine tuning an air flow rate with high adjustment precision, and it is disposed between the vacuum cut-off valve and the vacuum pump for accurately controlling the vacuumizing rate of the vacuum pump on the gas cavity, thereby realizing fine control of the internal pressure of the gas cavity.

Optionally, Beijing BeiyiWoosung TRP-12 direct-connected high-speed rotary vane vacuum pump is selected as the vacuum pump, with a pumping rate of 3 L/s and an ultimate pressure of $4\times10^{-1}$ Pa, which may be configured for implementing the pressure conditions required by the system. The pressure gauge is a resistance vacuum gauge with an effective measuring range of $3.0\times103$ Pa to $1.0\times100$ Pa, which may satisfy the pressure conditions for testing required by the system. The vacuum cut-off valve, the vent valve and the pressure micro-metering valve work together to meet the diversified requirements of large-range quick adjustment and small-range fine adjustment of the internal pressure of the gas cavity.

Optionally, as an embodiment, the gas cavity unit includes: the gas cavity, wherein: the gas cavity is configured for containing the at least one to-be-detected gas added by the sample introduction unit, so that the terahertz signals after passing through the to-be-detected gas are detected by the terahertz detection module; and the gas cavity is connected with the pressure control unit through a flange interface, and it is connected with the sample injection unit through a rubber-gasket sealed interface.

The gas cavity is configured for containing the detected gas added by the sample injection unit, thus enabling the terahertz signals are detected by the terahertz detection module after passing through the to-be-detected gas, so as to finally obtain the spectrogram of the to-be-detected gas, and identify the category of the to-be-detected gas according to the spectrogram. The gas cavity is composed of a quartz tube, a stainless-steel sleeve, window, various control valves and matching flange interfaces, which by matching with the pressure control unit, may adjust the pressure inside the gas cavity and control the component concentration ratio of the to-be-detected gas.

Preferably, an overall length of the gas cavity is 400 mm, a height of a central axis of the gas cavity from a bottom horizontal plane is 70.20 mm, and a maximum longitudinal width of the gas cavity is 180 mm. A quartz tube is used in a middle of a body of the gas cavity, which has the advantages of transparency and pressure resistance, as to directly observe states of the to-be-detected gas in the gas cavity, for example, whether liquefaction exists or not. The quartz tube has a length of 99 mm and an inner diameter of 66 mm. The gas cavity is provided with three KF16 standard flange interfaces, which are respectively configured for connecting the pressure gauge, the vent valve and the vacuum cut-off valve. In addition, one rubber-gasket sealed interface is provided to connect with a sample injection pipeline, so as to realize the sample injection of the to-be-detected gas on demand.

Optionally, as an embodiment, the terahertz detection module comprises: the field effect transistor detector, wherein: the field effect transistor detector is based on a two-dimensional plasmon and configured for detecting the amplitude signals of the terahertz signals after receiving the terahertz signals.

Figure 4:
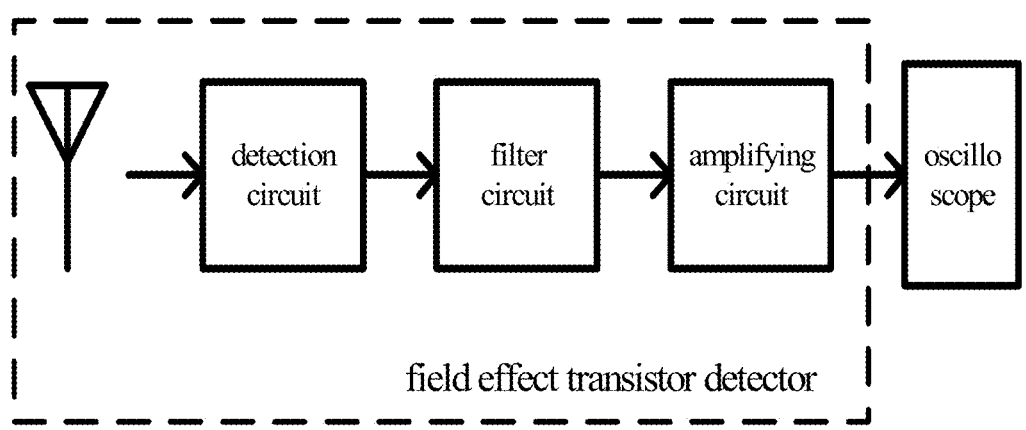
FIG. 4 is an internal architecture diagram of a field effect transistor detector in the embodiments of the present invention.

The field effect transistor detector is a terahertz detector composed of a AlGaN/GaN (aluminum gallium nitride/ gallium nitride) high electron mobility transistor coupled by a silicon lens. FIG. 4 is an internal architecture diagram of the field effect transistor detector. The field effect transistor detector comprises a silicon lens antenna, a detection circuit, a filter circuit and an amplifying circuit.

Preferably, the field effect transistor detector is designed with a center frequency of 340 GHz, and may work in a frequency range of 240 GHz to 380 GHz. A diameter of the silicon lens antenna coupled at a front end of the detector is 6 mm. A detection signal is output by a BNC port, and an intensity of an output signal may be adjusted by a shifting switch. The BNC port of the detector has an output impedance of 50Ω, a direct current bandwidth of 4 MHz, 7-gear adjustable gains (×100, ×200, . . . , ×700), and a saturated output voltage of 4 V. The detector has a responsivity (typical value) of 1 kV/W, and a noise equivalent power (typical value) of 30 $pW/Hz^{0.5}$.

The terahertz signals are received at the silicon lens antenna of the field effect transistor detector. The detector directly detects the amplitude signals of the terahertz signals, and then outputs the obtained amplitude detection signals to the oscilloscope of the program-control and acquisition module.

Optionally, as an embodiment, the program-control and acquisition module comprises: an oscilloscope and an upper computer, wherein: the oscilloscope is configured for reading voltage values of the amplitude detection signals output by the field effect transistor detector and transmitting the voltage values to the upper computer; the upper computer is configured for calculating and storing the voltage values, and generating the spectrogram of the to-be-detected gas according to the voltage values of the terahertz signals with different frequencies; the upper computer is further configured for synergistically controlling the terahertz generation module to generate the terahertz signals and the oscilloscope to read the voltage values; and the upper computer is further configured for determining whether all to-be-detected data points are completely and effectively stored by judging whether the preceding storage is completed or not.

The oscilloscope may be a digitized oscilloscope (Kesight DSOX-2202A), and the amplitude detection signals output via the BNC port is connected to an analog signal channel (CH1) of the oscilloscope. The oscilloscope acquires the terahertz signals with high resolution in a rolling time base mode. By setting a cursor tracking acquisition mode, the two cursors of the oscilloscope may real-time track the voltage values of the amplitude detection signals input by the CH1 channel, and then pass the read voltage values back to the upper computer for further calculation and storage.

The system uses direct detection to detect the outgoing terahertz waves. Therefore, in order to ensure that there are no leakage points in the acquisition, it is necessary to satisfy the synchronization conditions of terahertz wave transmission, reception and acquisition, as to ensure the accuracy of spectral data. In the system disclosed by the present disclosure, the processing time of the local oscillator signals by the solid-state frequency multiplication chain may be ignored, and the transmission path of the terahertz waves is relatively short and the transmission time is extremely short, so it may be approximately considered that there is no time delay between the transmission and reception of the terahertz signals. In conclusion, the accurate spectrum acquisition may be realized only by satisfying the synchronization between the local oscillator signals transmitted by the local oscillator and the back-end signal acquisition and processing.

Figure 5:
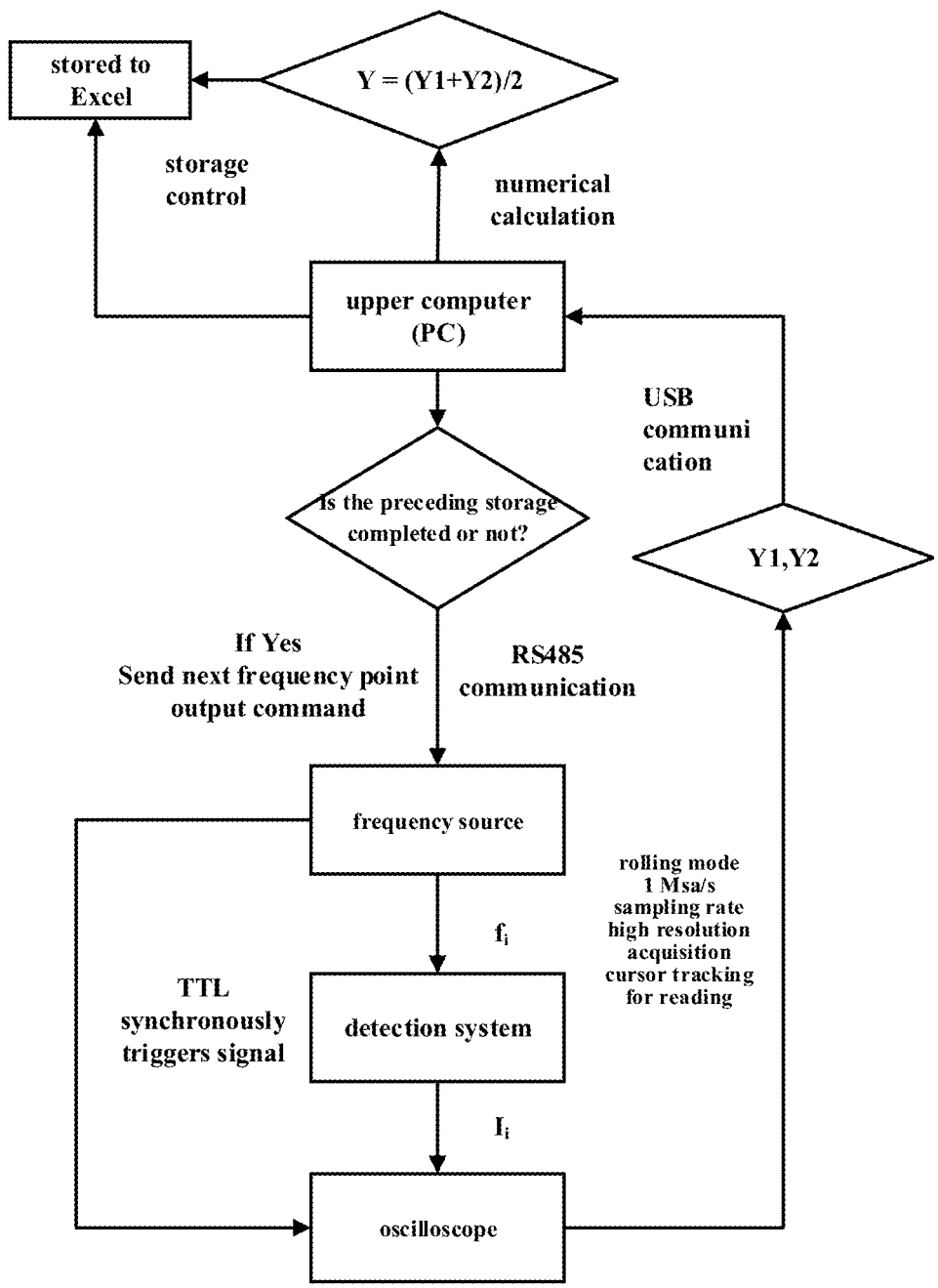
FIG. 5 is a block diagram of a programmed logic in the embodiments of the present invention.

FIG. 5 shows a block diagram of a programmed logic. In order to prevent the possible point leakage in the frequency sweep process, a synergic programmed logic between the local oscillator at a transmitting end and the oscilloscope at a receiving end is designed, and then the data acquired by the oscilloscope is stored, so as to implement "transmitting one point, acquiring one point and storing one point" and ensure data point acquisition integrity. After the preceding storage is completed, the upper computer synergistically controls the local oscillator to transmit the local oscillator signals and the oscilloscope to read the voltage values. As mentioned above, the time delay between a frequency source and the detection system, and the time delay between the detection system and the oscilloscope are ignored. The two cursors of the oscilloscope may acquire the terahertz signals with high resolution in the rolling time base mode, and may acquire two voltage values Y1 and Y2, and then send the two voltage values to the upper computer, wherein the oscilloscope communicates with the upper computer through a serial port. The upper computer takes an average value of the two voltage values as the voltage value of the terahertz signal, and then stores the voltage value. After the storage is completed, the generation and detection processes of the terahertz signals are repeated. The spectrogram of the to-be-detected gas may be generated according to the voltage values corresponding to the terahertz signals with different frequencies.

Optionally, as an embodiment, the steps of applying the terahertz gas spectrometer detection system proposed by the embodiments of the present disclosure may be as follows:

1. Exhausting the residual gas in the gas cavity: first of all, all the valves are opened, and then the vent valve is opened to restore the gas cavity to a normal-pressure state; and then, the vent valve is closed and the vacuum cut-off valve is opened, so that the vacuum pump vacuumizes the inside of the gas cavity to exhaust the residual gas in the gas cavity.

2. Adding the to-be-detected gas: there may be a plurality of to-be-detected gases which are stored in the sample bottle in liquid form in advance; according to the actual demand, the spherical control valve connected with the corresponding sample bottle is opened, so that the liquid to-be-detected sample volatilizes the to-be-detected gas to enter the gas cavity, and the relative concentration of the added to-be-detected gas is determined through the change value of the pressure in the gas cavity measured by the pressure gauge; and the vacuumizing rate is finely controlled in combination with the pressure micro-metering valve, so as to implement fine control of the internal pressure of the gas cavity.

3. Synergistically controlling, by the upper computer, the local oscillator to generate baseband signals and the oscilloscope to acquire data: the local oscillator generates the baseband signals, and the solid-state frequency multiplication chain multiplies the baseband signals to obtain and transmit terahertz signals; the transmitted terahertz signals after being collimated by the plano-convex lens pass through the gas cavity, and then are focused by another plano-convex lens to the antenna of the field effect transistor detector to receive the terahertz waves; and the field effect transistor detector completes direct detection and outputs the amplitude detection signals to the oscilloscope. The two cursors of the oscilloscope read the voltage values of the amplitude detection signals, and then transmit the read voltage values back to the upper computer.

4. Calculating and storing, by the upper computer, the voltage values: the upper computer takes the average value of the two voltage values returned by the oscilloscope as the voltage value of the terahertz signal, and then stores the voltage value.

5. Repeating steps 3 and 4: after the upper computer judges that the preceding storage is completed, steps 3 and 4 are repeated to obtain the voltage values of the terahertz signals with different frequencies passing through the to-be-detected gas.

6. Generating the spectrogram and determining the to-be-detected gas: according to the stored frequency and voltage value of each terahertz signal passing through the to-be-detected gas, the spectrogram of the to-be-detected gas is generated, so as to determine the category of the to-be-detected gas or analyze the structure of the to-be-detected gas according to the spectrogram.

According to the technical solutions of the embodiments of the present disclosure, the field effect transistor detector is adopted to detect the terahertz signals, which has the advantages on rapidness, sensitivity and no need for low temperature conditions, and it still has higher sensitivity in high frequency bands; the gas cavity adopts the vacuum cut-off valve and the pressure micro-metering valve for adapting works, which may implement the large-range coarse-tuning and small-range fine-tuning of the pressure in the gas cavity; the sample introduction is connected by the rubber gasket matched with the corrugated pipe, which may implement flexible disassembly while ensuring tightness; the sample introduction pipeline adopts the way of the main pipe and the branch pipes, which may implement the amplification of component quantity; the to-be-detected gas is stored in liquid form in the sample bottle, and the volatile sample injection is adopted, which is convenient to control the sample injection concentration in comparison to direct storage of gaseous to-be-detected gas; the units in the gas module are coordinate used, which may be used to carry out multi-component experiments with different pressures, component quantities and concentration ratios, and provide data basis for the subsequent acquisition of component gas spectra; the digitized oscilloscope is adopted to acquire two voltage values at high resolution in the rolling time base mode, which may reduce random errors; and the upper computer synergistically controls the frequency source to generate signals and the oscilloscope to acquire data, which may avoid acquisition leakage points and ensure the accuracy of spectral data. The terahertz gas spectrometer detection system according to the embodiments of the present disclosure has relatively low output power, and it has the advantages on quick response and high sensitivity, it also has a simple system architecture since a system architecture of front-end modulation (amplitude/frequency modulation) combined with a phase-locked amplifier is not adopted, it also has frequency band expansibility may to satisfy the requirements of multi-component gas sample introduction and testing under different pressure conditions, different component quantities and different concentration ratios.

Each embodiment in this specification is described in a progressive way, each embodiment focuses on the differences from other embodiments, and the same and similar parts between the embodiments may be referred to each other.

Although the preferred embodiments of the present disclosure have been described, persons skilled in the art may make additional changes and modifications to these embodiments once they know the basic inventive concepts. Therefore, the appended claims are intended to be interpreted as including the preferred embodiments and all the changes and modifications that fall within the scope of the embodiments of the present invention.

Finally, it should also be noted that the terms "including", "comprising" or any variations thereof are intended to embrace a non-exclusive inclusion, such that a process, a method, an article, or a terminal device including a series of elements, includes not only those elements but also includes other elements not expressly listed, or also includes elements inherent to such process, method, article, or terminal device. In the absence of further limitation, an element defined by the phrase "including a . . . " does not exclude the presence of additional identical element in the process, method, article, or terminal device.

The terahertz gas spectrometer detection system provided by the present application is described in detail above. Specific examples are applied to explain the principle and implementation of the present disclosure herein. The above embodiments are only used to help understand the system of the present application and the core idea thereof. Meanwhile, for those of ordinary skills in the art, there will be changes in the specific implementation and application scope according to the idea of the present application. To sum up, the contents of this specification should not be construed as limiting the present application.

What is claimed is:

1. A terahertz gas spectrometer detection system, wherein the system comprises: a terahertz generation module, a gas module, a terahertz detection module and a program-control and acquisition module;

the terahertz generation module is configured for generating and transmitting terahertz signals with different frequencies;

the gas module is configured for setting and storing to-be-detected gas, so that the terahertz signals with different frequencies pass through the to-be-detected gas;

the terahertz detection module is configured for detecting amplitude signals of the terahertz signals with different frequencies after passing through the to-be-detected gas through a field effect transistor detector; and the program-control and acquisition module is configured
for controlling a frequency that the terahertz generation
module generates and transmits the terahertz signal,
and is further configured for acquiring amplitude detection signals of the terahertz signals with different frequencies after passing through the to-be-detected gas, and generating a spectrogram of the to-be-detected gas.

2. The terahertz gas spectrometer detection system according to claim 1, wherein the terahertz generation module comprises: a local oscillator and a solid-state frequency multiplication chain, wherein:
the local oscillator is configured for generating baseband signals with different frequencies; and
the solid-state frequency multiplication chain is configured for frequency multiplication the baseband signals with different frequencies to obtain the terahertz signals with different frequencies and transmit the terahertz signals with different frequencies.

3. The terahertz gas spectrometer detection system according to claim 1, wherein the gas module comprises: a sample injection unit, a pressure control unit and a gas cavity unit, wherein:
the sample injection unit is configured for adding at least one to-be-detected gas into a gas cavity in the gas cavity unit;
the pressure control unit is configured for controlling a pressure in the gas cavity so as to control a relative concentration of each to-be-detected gas added in the gas cavity; and
the gas cavity unit is configured for enabling the terahertz signals with different frequencies generated by the terahertz generation module to pass through the gas cavity.

4. The terahertz gas spectrometer detection system according to claim 3, wherein the sample injection unit comprises: a pipeline, control valves and sample bottles, wherein:
the sample bottle is configured for storing the liquid to-be-detected sample, and the liquid to-be-detected sample enters the gas cavity by volatilizing the to-be-detected gas;
the pipeline comprises a main pipe and branch pipes, wherein: the main pipe is connected with a plurality of branch pipes, each branch pipe is connected with one sample bottle, and the main pipe is also connected with the gas cavity through a corrugated connecting pipe and a flange interface, so that the to-be-detected gas in the sample bottle enters the gas cavity through the branch pipes and the main pipe; and
the control valves are disposed on each branch pipe and configured for controlling a communication state between the sample bottle connected with each branch pipe and the gas cavity by adjusting on-off states of different control valves.

5. The terahertz gas spectrometer detection system according to claim 3, wherein the sample injection unit further comprises: a liftable support rod and a base, wherein:
the base is configured for lifting the sample bottle;
the liftable support rod implements a liftable function through screw adjustment and is configured for fixing and supporting the main pipe; and
the liftable support rod is further configured for supporting the base, so as to implement the liftable function of the base and provide a movable space for disassembling and installing the sample bottle.

6. The terahertz gas spectrometer detection system according to claim 3, wherein the pressure control unit comprises: a vacuum pump, a valve and a pressure gauge, wherein:
the vacuum pump is configured for vacuumizing an interior of the gas cavity;
the pressure gauge is arranged on the gas cavity and configured for measuring the pressure in the gas cavity so as to control the relative concentration of the to-be-detected gas in the gas cavity; and
the valves comprises a vent valve, a vacuum cut-off valve and a pressure micro-metering valve, wherein: the vent valve is arranged on the gas cavity and configured for controlling a communication state inside and outside the gas cavity; the vacuum cut-off valve is disposed between the vacuum pump and the gas cavity, and it is configured for controlling a vacuumizing effect of the vacuum pump on the gas cavity by adjusting on-off states; and the pressure micro-metering valve is disposed between the vacuum cut-off valve and the vacuum pump, and it is configured for controlling a vacuumizing rate of the vacuum pump on the gas cavity, thereby implementing fine control of the internal pressure of the gas cavity.

7. The terahertz gas spectrometer detection system according to claim 3, wherein the gas cavity unit comprises: the gas cavity, wherein:
the gas cavity is configured for containing the at least one to-be-detected gas added by the sample introduction unit, so that the terahertz signals after passing through the to-be-detected gas are detected by the terahertz detection module; and
the gas cavity is connected with the pressure control unit through the flange interface, and is connected with the sample injection unit through a rubber-gasket sealed interface.

8. The terahertz gas spectrometer detection system according to claim 1, wherein the terahertz detection module comprises: the field effect transistor detector, wherein:
the field effect transistor detector is based on a two-dimensional plasmon and configured for detecting the amplitude signals of the terahertz signals after receiving the terahertz signals.

9. The terahertz gas spectrometer detection system according to claim 1, wherein the program-control and acquisition module comprises: an oscilloscope and an upper computer, wherein:
the oscilloscope is configured for reading voltage values of the amplitude detection signals output by the field effect transistor detector and transmitting the voltage values to the upper computer;
the upper computer is configured for calculating and storing the voltage values, and generating the spectrogram of the to-be-detected gas according to the voltage values of the terahertz signals with different frequencies;
the upper computer is further configured for synergistically controlling the terahertz generation module to generate the terahertz signals and the oscilloscope to read the voltage values; and
the upper computer is further configured for determining whether all to-be-detected data points are completely and effectively stored by judging whether the preceding storage is completed or not.

10. The terahertz gas spectrometer detection system according to claim 9, wherein the oscilloscope is configured for reading the voltage values of the amplitude detection signals output by the field effect transistor detector, comprising:

setting two cursors of the oscilloscope, and acquiring the amplitude detection signals with high resolution in a rolling time base mode to obtain two voltage values.

* * * * *